(12) United States Patent
Singh Riar et al.

(10) Patent No.: US 9,473,013 B2
(45) Date of Patent: Oct. 18, 2016

(54) CONTROLLING A MODULAR CONVERTER WITH A PLURALITY OF CONVERTER MODULES

(71) Applicant: ABB Technology AG, Zürich (CH)

(72) Inventors: Baljit Singh Riar, Auckland (NZ); Tobias Geyer, Zürich (CH)

(73) Assignee: ABB Schweiz AG, Baden (CH)

( * ) Notice: Subject to any disclaimer, the term of this patent is extended or adjusted under 35 U.S.C. 154(b) by 10 days.

(21) Appl. No.: 14/413,149

(22) PCT Filed: Jul. 5, 2013

(86) PCT No.: PCT/EP2013/064297
§ 371 (c)(1),
(2) Date: Jan. 6, 2015

(87) PCT Pub. No.: WO2014/006200
PCT Pub. Date: Jan. 9, 2014

(65) Prior Publication Data
US 2015/0171726 A1    Jun. 18, 2015

(30) Foreign Application Priority Data

Jul. 6, 2012  (EP) .................................... 12175409
Aug. 3, 2012  (EP) .................................... 12179163

(51) Int. Cl.
*H02M 1/08* (2006.01)
*H02M 7/06* (2006.01)
(Continued)

(52) U.S. Cl.
CPC ................ *H02M 1/08* (2013.01); *H02M 1/12* (2013.01); *H02M 7/06* (2013.01); *H02M 7/487* (2013.01);
(Continued)

(58) Field of Classification Search
CPC ........................................................ H20M 1/08
USPC ................................................. 363/65, 56.01
See application file for complete search history.

(56) References Cited

U.S. PATENT DOCUMENTS

2007/0290639 A1* 12/2007 Mori ...................... B62D 5/046
                                                        318/400.42
2008/0232145 A1*  9/2008 Hiller ................... H02H 7/1225
                                                        363/56.01
(Continued)

OTHER PUBLICATIONS

International Search Report (PCT/ISA/210) mailed on Sep. 17, 2013, by the European Patent Office as the International Searching Authority for International Application No. PCT/EP2013/064297.
(Continued)

*Primary Examiner* — Jeffrey Gblende
*Assistant Examiner* — Trinh Dang
(74) *Attorney, Agent, or Firm* — Taft Stettinius & Hollister LLP

(57) ABSTRACT

A method for controlling a modular converter with a plurality of converter modules includes: selecting possible future switching sequences of the converter based on an actual converter switching state; predicting a future current trajectory for each switching sequence based on actual internal currents and on actual internal voltages; and determining candidate sequences from the switching sequences, wherein a candidate sequence is a switching sequence with a current trajectory that respects predefined bounds with respect to a reference current or, when a predefined bound is violated, moves the current closer to such a predefined bound. The method includes predicting future module voltages for each candidate sequence; evaluating a cost function for each candidate sequence; and selecting the next converter switching state as a first converter switching state of a candidate sequence with minimal costs.

20 Claims, 8 Drawing Sheets

(51) Int. Cl.
*H02M 7/487* (2007.01)
*H02M 7/797* (2006.01)
*H02M 1/12* (2006.01)
*H02M 1/00* (2006.01)
*H02M 3/335* (2006.01)
*H02J 3/18* (2006.01)
*H02M 7/483* (2007.01)

(52) U.S. Cl.
CPC ............ *H02M 7/797* (2013.01); *H02J 3/1857* (2013.01); *H02M 3/33584* (2013.01); *H02M 2001/0054* (2013.01); *H02M 2007/4835* (2013.01); *Y02B 70/1491* (2013.01); *Y02E 40/26* (2013.01)

(56) References Cited

U.S. PATENT DOCUMENTS

2011/0181225 A1   7/2011   Geyer
2013/0119901 A1*  5/2013   Gries ................ H02M 1/12
                                              318/400.3

OTHER PUBLICATIONS

Written Opinion (PCT/ISA/237) mailed on Sep. 17, 2013, by the European Patent Office as the International Searching Authority for International Application No. PCT/EP2013/064297.

International Preliminary Report on Patentability (PCT/IPEA/409) mailed on May 6, 2014, by the European Patent Office as the International Searching Authority for International Application No. PCT/EP2013/064297.

European Search Report (EPO Form 1507N) mailed Jan. 7, 2013.

Perez et al., "Predictive control of AC AC Modular Multilevel Converters", IEEE Transactions on Industrial Electronics, vol. 59, No. 7, Jul. 1, 2012, pp. 2832-2839.

Ceballos et al., "Analysis of voltage balancing limits in modular multilevel converters", IECON 2011—37th Annual Conference on IEEE Industrial Electronics Society, Nov. 7, 2011, pp. 4397-4402.

Geyer, "Generalized Model Predictive Direct Torque Control: Long prediction horizons and minimization of switching losses", Decision and Control, Dec. 15, 2009, pp. 6799-6804.

Qin et al., "Predictive Control of a Modular Multilevel Converter for a Back-to-Back HVDC System", IEEE Transactions on Power Delivery, vol. 27, No. 3, Jul. 1, 2012, pp. 1538-1547.

\* cited by examiner

US 9,473,013 B2

CONTROLLING A MODULAR CONVERTER WITH A PLURALITY OF CONVERTER MODULES

FIELD OF THE INVENTION

The invention relates to a method for controlling a modular converter, a controller for controlling a modular converter and a modular converter.

BACKGROUND OF THE INVENTION

Electrical converters, in particular in the medium and high voltage area, are used for converting a first current with a first frequency and a first voltage into a second current with a second frequency and a second voltage. Many types of converters are known such as for converting AC to AC, AC to DC, DC to AC and DC to DC.

Usually, converters comprise high power semiconductors for switching internally currents to produce the desired output current. In modular converters, these power semiconductors are distributed among converter modules, which also may comprise further components like a controller for the semiconductors or a capacitor for storing energy in the converter module.

For example, the M2LC topology has become popular in both medium and high voltage applications. An M2LC converter or modular multi-level converter comprises converter arms with converter modules connected in series for generating a multi-level output voltage. In an M2LC converter the converter modules each comprise a capacitor themselves.

The standard approach to achieve closed-loop control for an M2LC converter is to divide the control problem into two hierarchical layers. The upper layer is based on vector control with a modulator. The vector control scheme operates in a orthogonal reference frame rotating with a certain angular velocity. By manipulating the voltage reference to the modulator, closed-loop control of the load currents can be achieved. Typically, carrier-based pulse width modulation (PWM) or space vector modulation (SVM) is used as modulator. The circulating currents and/or the energy balance within the converter arms may be addressed by adding additional control loops.

The lower control layer utilizes the redundancy in the converter states (e.g. groups of switching states that produce the same line to line voltage, and/or groups of switching states that produce the same arm voltage) in order to balance the capacitor voltages. The capacitor voltages are sorted in an ascending/descending order of their voltage values. For a charging current the capacitors with the lowest voltages are selected first, and conversely, the capacitors with the highest voltages are prioritized for discharging currents.

DESCRIPTION OF THE INVENTION

It is an objective of the invention to provide an alternative solution for controlling a modular converter, to reduce the switching losses of a modular converter, to balance the capacitor voltages, and to reduce harmonics in the input and output currents of a modular converter.

It is a further objective of the invention to provide a control schema with good performance during steady-state as well as during transient operating conditions.

These objectives are achieved by the subject-matter of the independent claims. Further exemplary embodiments are evident from the dependent claims and the following description.

An aspect of the invention relates to a method for controlling a modular converter with a plurality of converter modules. A converter module may comprise a number of power semiconductors and optionally a capacitor or more generally an energy storage and/or an energy source. For example, the power semiconductors are interconnected in such a way, that two power connectors of each of the modules may be short-circuited in a first switching state and may be connected to the energy storage and/or the energy source in a second switching state.

The method comprises the steps of: selecting possible future switching sequences, predicting a future current trajectory for each switching sequence, determining candidate sequences from the switching sequences, predicting future module voltages for each candidate sequence, evaluating a cost function for each candidate sequence and selecting the next converter switching state based on the result of the cost function.

The possible future switching sequences of the converter are selected based on an actual converter switching state, wherein a switching sequence is a series of converter switching states with at least one converter switching state and a converter switching state comprises switching states of the converter modules.

The future current trajectory for each switching sequence is predicted based on actual internal currents of the modular converter and on actual internal voltages of the modular converter. The current trajectory may be a trajectory of a load current, an arm current or a circulating current. The future current trajectory may be predicted for more than one time step in the future. For example, the actual internal currents comprise arm currents and/or a DC link current and/or circulating currents, the actual internal voltages may comprise phase voltages and/or arm voltages and/or the DC link voltage. For example, based on an internal state-space model of the converter, the trajectories of key system variables, such as load currents, circulating currents and/or capacitor voltages, are predicted for all admissible switching sequences.

The candidate sequences are determined from the switching sequences such that a candidate sequence is a switching sequence with a current trajectory that respects predefined bounds with respect to a reference current or, when a predefined bound is violated, moves the current trajectory closer to the predefined bound. For example, a load current may be kept within symmetrical bounds around its sinusoidal references. The total harmonic distortion of the current may be adjusted by varying the width of the predefined bounds. The relationship between the total harmonic distortion and the bound width is usually effectively linear.

Switching sequences that keep the load currents within their bounds or move them closer to the bounds (when they are violated) are determined and called candidates. These candidate trajectories are extrapolated or extended until a certain criterion is met such as the violation of a hysteresis bound. At this point new switching vectors can be considered and another extrapolation step can be performed, and so on.

The future module voltages for each candidate sequence are predicted based on actual module voltages and the current trajectory of the respective candidate sequence. For example, from predicted currents and the switching states the voltage between the outputs of a converter module and/or across a capacitor of the converter module may be calculated.

The cost function is evaluated for each candidate sequence. The cost function is based on the converter switching states of the switching sequence, the future module voltages and or future currents. For example, the value of the cost function may be based on the number of switchings between switching states and/or the switching losses caused by the switchings of a switching sequence. In general, the cost function may include the predicted short-term switching frequency (or switching losses), the violation of the current bounds, the deviation of the capacitor voltages from their references, the mismatch between capacitor voltages within an arm, etc. The future currents may be internal current determined for the current trajectories and/or may be future load currents.

The next converter switching state is selected as the first converter switching state of a candidate sequence with minimal costs. Minimizing the cost function yields the optimal switching vector. At the next sampling instant, new measurements or estimates may be obtained and the above described optimization process may be repeated over a shifted horizon, according to a so-called receding horizon policy. With the method, the switching states are manipulated directly. An intermediate stage, such as a modulator, is not required.

The method features an online optimization process to determine the future control inputs, without using a modulation stage, to directly control the load currents and offers a great flexibility to handle various system objectives.

The method may be implemented in a controller with only a single control loop, while the considered currents are kept within upper and lower bounds around their references.

The method has the advantages of direct current control without a modulation stage, of a fixed and controlled ripple of the load currents, and of very short response times during transients. At steady-state, the desired trade-off may be set by the weights in the cost function.

Furthermore, the capacitor voltages may be balanced around their nominal voltages. In this case, the energy stored in the converter may be controlled, the converter modules may be equally voltage stressed, the arm currents may be optimized, circulating currents may be reduced, and conduction losses are lowered.

At steady-state operating conditions and for a given load current distortion, the lowest possible switching frequency may be achieved.

According to an embodiment of the invention, each converter module has exactly two power connectors which are short-circuited in the first switching state of the semiconductors and are connected to the energy storage and/or energy source in the second switching state of the semiconductors.

According to an embodiment of the invention, the cost function is based on a number of switching operations between two consecutive converter switching states. In such a way, the number of switching operations may be reduced or minimized.

According to an embodiment of the invention, the cost function is based on a difference between module voltages of converter modules of a converter arm comprising at least two converter modules connected in series. In such a way, the differences between capacitor voltages may be minimized.

According to an embodiment of the invention, the cost function is based on a difference between a module voltage and a supply voltage at an input of the converter. In such a way, a reference value for the phase voltage may be set and ripples around the reference value may be reduced.

According to an further embodiment of the invention, the cost function is based on a difference between a module voltage and a supply voltage of the converter divided by the number of modules per arm. In such a way, a reference value for the phase voltage may be set and ripples around the reference value may be reduced.

According to an embodiment of the invention, the cost function is based on a difference between the sum of module voltages of a first converter arm for a phase and the sum of module voltages of a second converter arm for the same phase or a different phase. In such a way, the imbalance in capacitor voltages of different converter arms may be minimized.

According to an embodiment of the invention, the cost function is based on a difference between the sum of module voltages of a first phase and the sum of module voltages of a second phase. In such a way, the imbalance in capacitor voltages of different converter phases may be minimized.

According to an embodiment of the invention, the method further comprises the step of: deselecting candidate sequences for which future module voltages do not stay within predefined bounds. Also the module voltages may be constrained to predefined bounds. Furthermore, the number of admissible candidate sequences may be reduced on which the cost function has to be evaluated.

According to an embodiment of the invention, each converter module comprises a module capacitor. In particular, a modular multi-level converter may comprise converter modules with a capacitor that is adapted for storing energy in the converter module. The module voltages that are predicted and optimized with the method may be capacitor voltages over module capacitors.

According to an embodiment of the invention, a switching sequence comprises a switching step associated with a converter switching state, in which switching step the future current of the converter is predicted when switching the converter into the associated converter switching state; and/or a switching sequence comprises an extrapolation step, in which the load current is extrapolated over at least one time step until it violates the bounds for the load current. In general, a switching sequence may comprise a plurality of steps which either are switching steps or extrapolation steps.

The set of switching sequences determined by the method may be established by using the notion of S ("switch") and E ("extend", "extrapolate"), forming the switching horizon. The switching horizon may comprise any combination of S and E steps. The extrapolation step may be approximated, for example using linear or quadratic extrapolation, or prediction with quadratic interpolation. Higher order approximations are possible, too. The notion of switch and extend achieves long prediction horizons, and therefore better steady-state performance, while using a short switching horizon, ensuring that the computational burden is kept at bay. The switching horizon may be composed of an arbitrary sequence of elements S and E.

According to an embodiment of the invention, the future current trajectory is predicted based on a first internal model of the converter. The future module voltages may be predicted based on a second internal model of the converter, which is dependent on the first internal model. The two internal models may be state space models of the converter. The first model may capture the evolution of the currents, including the load and the circulating currents, while the second model may capture the evolution of the capacitor voltages. The second model may be dependent on the first model in such a way, that it is based on values predicted by the first model. For example, the two models may be expressed as matrix equations and/or may be linear models.

The first model may be based on linear equations between future currents, actual currents, actual internal voltages and switching states.

The second model may be based on linear equations between future internal voltages, actual internal voltages, actual currents and switching states According to an embodiment of the invention, the method further comprises the steps of: changing the converter topology by bypassing a converter module; and adapting the first and/or the second model to the changed converter topology. The converter modules of the converter may be monitored in real-time. If a module fails and its terminals have to be shortened to bypass it, the number of converter modules available is automatically updated and the internal prediction models of the controller is adjusted accordingly. The method may take into account that one or some converter modules are shortened and uses only switching states/ sequences that, within the physical limitations of the converter, compensate for these shortened converter modules.

A further aspect of the invention relates to a computer program, which, when being executed on a processor, is adapted for executing the steps of the method as described in the above and in the following. For example, the computer program may be executed in a processor of a controller of the modular converter.

A further aspect of the invention relates to a computer-readable medium in which such a computer program is stored. A computer-readable medium may be a floppy disk, a hard disk, an USB (Universal Serial Bus) storage device, a RAM (Random Access Memory), a ROM (Read Only Memory) and an EPROM (Erasable Programmable Read Only Memory). A computer-readable medium may also be a data communication network, e.g. the Internet, which allows downloading a program code.

A further aspect of the invention relates to a controller for controlling a modular converter, wherein the controller is adapted for executing the steps of the method as described in the above and in the following. The proposed controller may achieve very fast current responses during transients, such as power up or down, or faults. This is in contrast to methods, which focus on the steady-state operation and are, as a result, very slow during transients. The capacitor voltages may be kept more closely to their references i.e. may be better balanced. The switching frequency can be reduced, compared to methods using PWM or SVM.

For example, the controller comprises a DSP and/or FPGA, in which the method is implemented.

A further aspect of the invention relates to a modular converter with a plurality of converter modules each having a capacitor; and a controller that is adapted for executing the steps of the method as described in the above and in the following.

For example, the modular converter is a modular multi-level (M2LC) converter, which may have at least one converter arm with at least two converter modules connected in series. In general, the method may be used for any M2LC control problem. It may be used in M2LC converters with a few modules per arm. It is applicable to all M2LC applications, including variable speed drives, high-voltage direct current transmission, flexible AC transmission systems, static synchronous compensators, grid-interfaces for battery energy storage systems or PV modules, traction applications, etc. The control scheme is highly flexible allowing one to incorporate and address different control objectives and operation requirements.

These and other aspects of the invention will be apparent from and elucidated with reference to the embodiments described hereinafter.

BRIEF DESCRIPTION OF THE DRAWINGS

The subject matter of the invention will be explained in more detail in the following text with reference to exemplary embodiments which are illustrated in the attached drawings.

In principle, identical parts are provided with the same reference symbols in the figures.

DETAILED DESCRIPTION OF EXEMPLARY EMBODIMENTS

Topology and Internal Models for a Modular Converter

Figure 1:
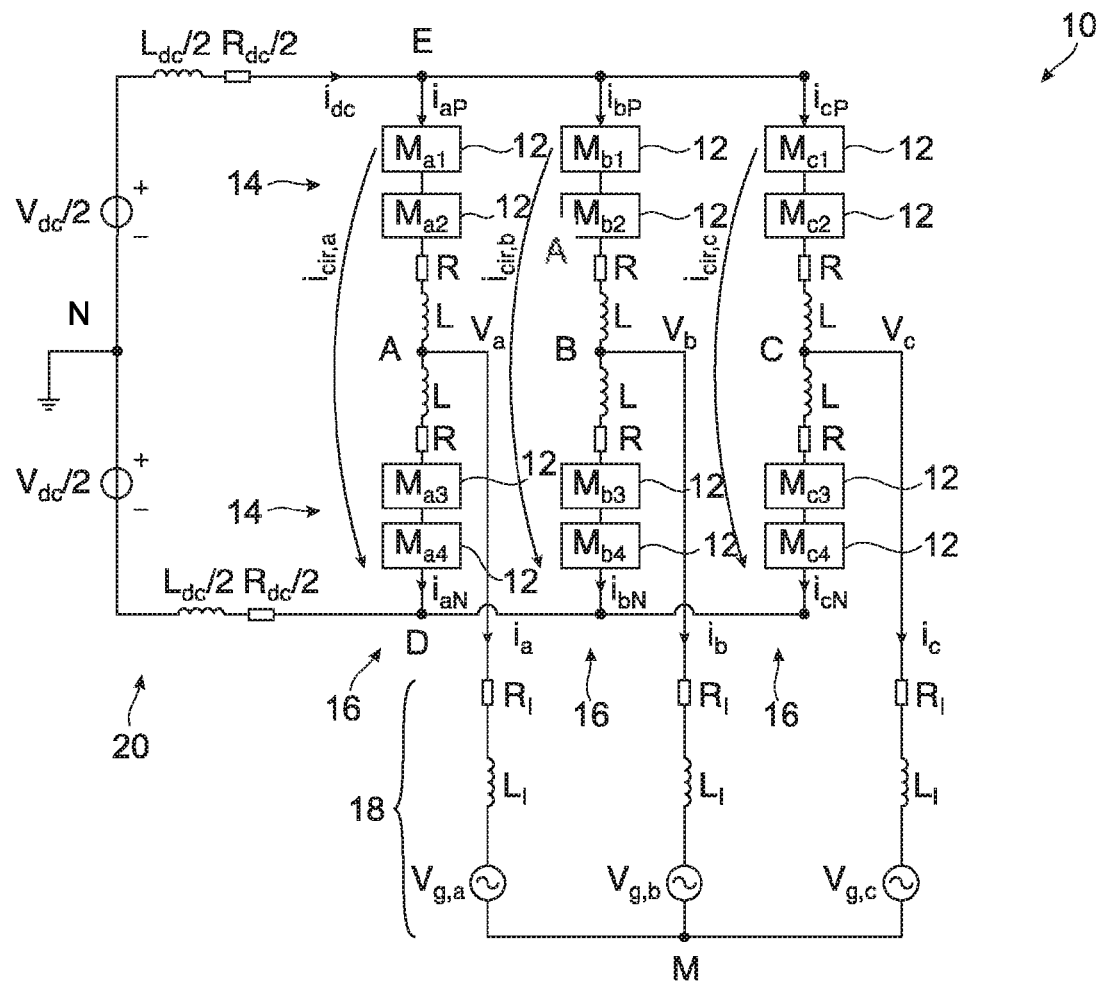
FIG. 1 schematically shows a modular converter according to an embodiment of the invention.

FIG. 1 shows the topology of a DC-AC modular multi-level converter 10 with two converter modules 12 per converter arm 14. The embodiment of FIG. 1 show M=3 converter phases 16 each comprising an upper and a lower converter arm 14. However, it has to be understood that embodiments of method described in the above and in the following may be applied to converters with an arbitrary number of converter modules 12 per converter arm 14 and with an arbitrary number of converter phases 16.

In case the converter 10 has N=2 converter modules 12 per converter arm 14 and three converter phases 16, the converter has a total of 6N=12 converter modules. The modules are referred to by $M_{pq}, p \in \{a,b,c\}, q \in \{1,2,3,4\}$.

Besides the two converter modules 12, each arm 14 comprises a resistor R that models conduction losses and an arm inductor L connected in series with the converter modules 12.

The two converter arms 14 of a converter phase 16 are connected in series with a connection point A, B, C for a load 18, which may be a three phase load. Each of the converter phases 16 is connected in parallel to a DC voltage supply 20 via the connection points E and D. The DC voltage supply 20 comprises a DC supply inductor $L_{dc}$ and a resistor $R_{dc}$ that model the parasitic inductance and resistance, respectively. The current driven by the DC link voltage of the DC voltage supply 20 is referred to as the DC link current $i_{dc}$.

The converter 10 shown in FIG. 1 provides three voltages levels, $$\frac{V_{dc}}{2},$$

$$0,$$

$$-\frac{V_{dc}}{2},$$

at its output terminals $V_a$, $V_b$, $V_c$, with respect to the supply ground (node N). The output terminals $V_a$, $V_b$, $V_c$ are connected to the load 18. The load 18 shown in FIG. 1 is modeled by load inductor $L_l$ in series with a load resistor $R_l$ and the grid voltage $V_{g,p}$.

Figure 2:
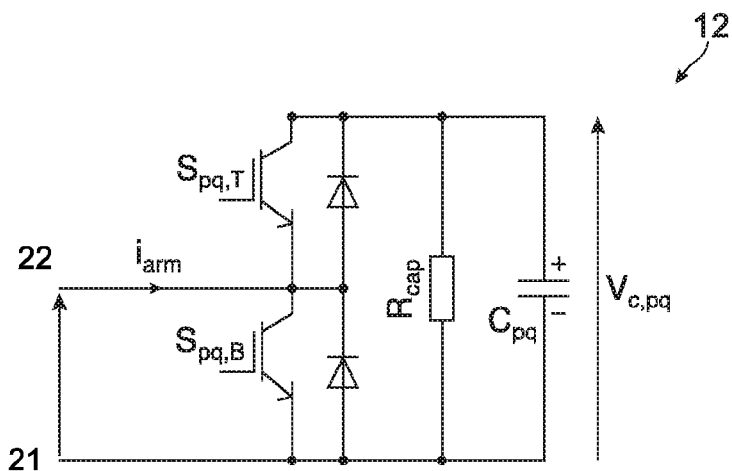
FIG. 2 schematically shows a converter module of the converter of FIG. 1.

FIG. 2 shows a converter module 12 for the converter of FIG. 1. The converter module 12 comprises two power semiconductor switches $S_{pq,T}$ and $S_{pq,B}$ which are connected in series and in parallel to a capacitor $C_{pq}$. The converter module 12 acts like a chopper cell with the capacitor $C_{pq}$. The converter module 12 has two switching states, $u_{pq} \in \{0, 1\}$, where 1 means that the capacitor $C_{pq}$ is connected in the circuit, i.e. switch $S_{pq,T}$ is on, and 0 means that the capacitor is disconnected from the circuit, i.e. switch $S_{pq,T}$ is off. The operation of the switches $S_{pq,T}$, $S_{pq,B}$ is complementary to one another. The resistor $R_{cap}$ is connected in parallel to the capacitor $C_{pq}$ to model the leakage current of the capacitor $C_{pq}$.

The converter module 12 has two power connectors 21, 22, which are acting as the input as well as the output of the converter module. Beside the power connectors 21, 22 the converter module might have further connections for controlling the converter module, for diagnose purposes and other control objectives. The power connectors 21, 22 can either short circuited or connected to the capacitor by the power semiconductors switches.

The two power connectors 21, 22 of each converter module are also referred to as the inputs. Further, the voltage $V_{c,pq}$ of the capacitor $C_{pq}$ is referred to as the module voltage as well as capacitor voltage $V_{c,pq}$.

An embodiment of the method is described hereafter for the specific case of a three-level M2LC converter 10 with N=2 modules per arm and M=3 phases. In a subsequent section, the approach is generalized.

The output equations for the load current in phases a, b and c are as follows:

$$i_a(t) = i_{aP}(t) - i_{aN}(t)$$

$$i_b(t) = i_{bP}(t) - i_{bN}(t)$$

$$i_c(t) = -i_{aP}(t) + i_{aN}(t) - i_{bP}(t) + i_{bN}(t)$$

The equation which defines the circulating currents in phases a, b and c is as follows:

$$i_{cir,p}(t) = \frac{i_{pP}(t)}{2} + \frac{i_{pN}(t)}{2} - \frac{i_{dc}}{3},$$

$$p \in \{a, b, c\}$$

Two internal models of the converter 10 are derived from these equations to predict the arm currents $i_{pP}$, $i_{pN}$ and the capacitor voltages $V_{c,pq}$. The state equations of the arm currents $i_{pP}$, $i_{pN}$ are derived by applying Kirchhoff's voltage law around the five circuit meshes.

The state vector of the first model is $x_i = [i_{aP} \ i_{aN} \ i_{bP} \ i_{bN} \ i_{dc}]^T$ and its input vectors are the switching states $u = [u_{a2} \ u_{a3} \ u_{a4} \ u_{b1} \ u_{b2} \ u_{b3} \ u_{b4} \ u_{c1} \ u_{c2} \ u_{c3} \ u_{c4}]^T \in \{0,1\}^{12}$ and the grid voltages and the DC voltage across the converter's input terminals $V_{gd} = [V_{g,a} \ V_{g,b} \ V_{g,c} \ V_{ED}]^T$. The load currents $y_i = [i_a \ i_b \ i_c]^T$ constitute the output vector of the first model. Note that the index i in $x_i$ and $y_i$ refers to the arm currents.

The first discrete-time model is as follows:

$$x_i(k+1) = A_i x_i(k) + B_{i1} u(k) + B_{i2} V_{gd}$$

$$y_i(k+1) = C_i x_i(k+1)$$

The model matrices $A_i$, $B_{i1}$, $B_{i2}$ and $C_i$ may be derived from the above equations and by applying Kirchhoff's laws to the topology of the converter 10.

The capacitors $C_{pq}$ are charged or discharged depending on the switching state of the converter model 12 and the polarity of the arm current $i_{pP}$, $i_{pN}$. The state equations of the capacitor voltages $V_{c,pq}$ can be derived by applying Kirchhoff's current law.

The vector $[V_{c,a1} \ V_{c,a2} \ V_{c,a3} \ V_{c,a4} \ V_{c,b1} \ V_{c,b2} \ V_{c,b3} \ V_{c,b4} \ V_{c,c1} \ V_{c,c2} \ V_{c,c3} \ V_{c,c4}]$ is both state $x_c$ and output $y_c$ vector of the second model. The second discrete-time model is as follows:

$$x_c(k+1) = A_c x_c(k) + B_c u(k)$$

$$y_c(k+1) = C_c x_c(k+1)$$

The definition of the model matrices $A_c$, $B_c$ and $C_c$ may be derived from the above equations and by applying Kirchhoff's laws to the topology of the converter 10.

Control Method

Figure 3:
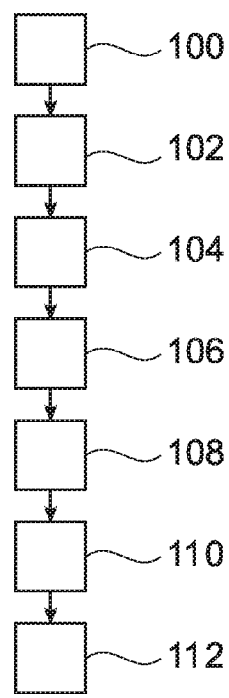
FIG. 3 shows a flow diagram for a method for controlling a modular converter according to an embodiment of the invention.

FIG. 3 shows a flow diagram for a method for controlling the converter 10.

In the optional step 110, it is determined whether one converter module 12 has to be bypassed, for example in the case of a fault. In this case, the first and the second model are adapted to the changed converter topology. Furthermore, in the future only switching sequences may be selected that do not rely on the converter module that has been bypassed.

In step 102, at time step k, possible future switching sequences of the converter are enumerated based on an actual converter switching state u(k−1). For example, the future switching sequences comprise the admissible switching states u(k), the converter 10 may be switched to at time-step k. In general, a switching sequence may comprise one or more future switching states u(k), u(k+1) . . . .

In step 104, a future current trajectory is predicted for each switching sequence based on actual internal currents and on actual internal voltages. For example, the current trajectories are determined with a "SE" scheme, i.e. in a first step, the future current is predicted for the time step k+1 based on the first model and, in a second step, the future current is extrapolated to later time steps.

It has to be noted that other switching schemes may be used, for example "SSE", "SESE", "SSESE" or "SESESE".

The above referred internal currents are the internal currents of the converter 10 such as e.g. DC link current $i_{dc}$, circulating currents $i_{cir,p}$ and/or arm currents $i_{pP}$, $i_{pN}$. The above referred internal voltages are the internal voltages of the converter 10 such as e.g. the DC link voltage $V_{dc}$ of the DC voltage supply 20, the phase voltages $V_a$, $V_b$, $V_c$ at its connection points A, B, C and/or module voltage or capacitor voltage $V_{c,pq}$ of each converter module 12.

Figure 4:
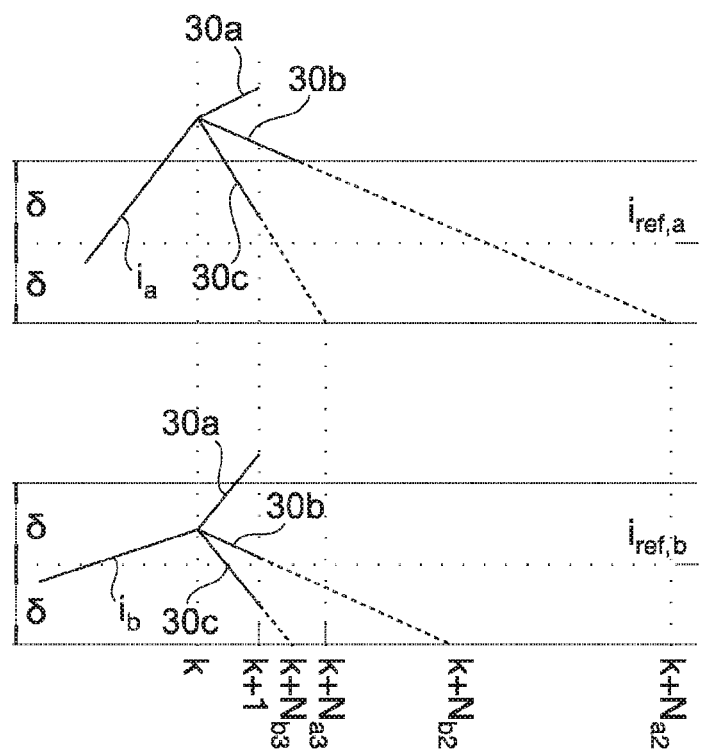
FIG. 4 shows current trajectories according to an embodiment of the invention.

FIG. 4 shows current trajectories for load current $i_a$ of phase a (top) and for load current $i_b$ of phase b (bottom). As an example, for phases a and b, only three out of $j_{max}=216$ predicted load current trajectories are shown in FIG. 4.

Given the arm currents $i_{pP}$, $i_{pN}$ and the capacitor voltages $V_{c,pq}$ at time-step k, the load currents $i_p$ are predicted at time-step k+1 using the first model for all $j_{max}=216$ possible switching sequences. This implements the first part, S, of the "SE" scheme.

In step 106, candidate sequences are determined from the switching sequences, wherein a candidate sequence is a switching sequence with a current trajectory that respects predefined bounds with respect to a reference current.

For example, candidate sequences $j \in J$ with $J=\{1,2,3 \ldots, j_{max}\}$, based on the predicted load currents $i_p$ (k+1) are determined, wherein those switching sequences have been rejected for which a load current $i_p$ (k+1) violates bounds at k+1. Here, the candidate sequences are those switching sequences that yield current trajectories that are either inside of the bounds or their violation decreases with time.

As an example, in FIG. 4, the bounds are defined by an offset value $\delta$ that is one half of the allowable ripple band around the reference currents $i_{ref,p}$. Note that $\delta$ is a design parameter that adjusts the current distortions.

The TDD of the load current can be controlled by adjusting the ripple $\delta$. There is a linear relationship between the Total Demand Distortion (TDD) and the $\delta$ band, where the TDD is a measure of the load current harmonic distortion.

The load current ripple $i_{r,p}(k+1)$ for a current trajectory may be determined for each phase by subtracting the predicted load current $i_p(k+1)$ from the sinusoidal reference $i_{ref,p}$ for all switching sequences, $i_{r,p}(k+1)=i_p(k+1)-i_{ref,p}$, where $i_{ref,p}$ is the future load current reference.

In the example of FIG. 4, the switching sequence 30a is not a candidate sequence because the respective load current trajectory violates the upper bound, for both phase a and b, at time-step k+1. For the second sequence 30b, the current $i_p$ at k+1 will remain outside of its bound for phase a, but its violation decreases from k to k+1, making it a candidate sequence. When selecting the third switching sequence 30c, the predicted load current $i_p$ at k+1 is predicted to be within the hysteresis bounds, making it a candidate sequence.

In step 108, the current for a switching sequence is extrapolated over at least one time step until it violates the bounds for the respective current.

For example, the candidate trajectories are linearly extrapolated from time-step k+1 onwards until they violate the predefined bounds. This may implement the second part, E, of the "SE" scheme. This extrapolated length, $N_p$ may be represented in multiples of the sampling period T. For example for the switching sequence 30b at time-step k+1, the load current trajectories can be kept within the bounds for a length of $N_2=\min(N_{a2},N_{b2},N_{c2})$, before requiring a new switching event at time-step $k+N_2$.

In step 110, future module voltages for each candidate sequence are predicted based on actual module voltages, the predicted current trajectory of the respective candidate sequence and the candidate (switching) sequence. For example, the capacitor voltages $V_{c,pq}$ are predicted using the second state-space model, for all the predetermined candidate sequences. The capacitor voltages $V_{c,pq}$ are then extrapolated for the number of time steps determined in step 108. The capacitor voltages $V_{c,pq}$ at time-step $k+N_j$, $j \in J$ may be denoted as terminal capacitor voltages, $V_{c,pq}(k+N_j)$.

It has to be noted, that step 110 may be included in step 102, 104, 106 or 108.

Optionally, candidate sequences may be deselected for which future module voltages do not stay within predefined bounds. Analogously to the currents, bounds may be defined for the module voltages (for example the capacitor voltages $V_{c,pq}$), and the candidate sequences may be constrained to switching sequences with module voltages within these bounds.

In step 110, a cost function is evaluated for each candidate sequence. Possible embodiments of cost functions will be given below. In such a way, every candidate sequence is associated with a cost value calculated with the cost function.

In step 112, the next converter switching state is selected as the first converter switching state of a candidate sequence with minimal costs. The switching sequence with minimum cost, i.e. with a minimal cost value, is selected and its first switching state implemented at time-step k.

A receding horizon policy may be implemented by repeating the steps 100 to 112 at the next sampling instant. For example, sampling period $T_s$, i.e. the time between two steps may be 25 μs.

Controller

Figure 5:
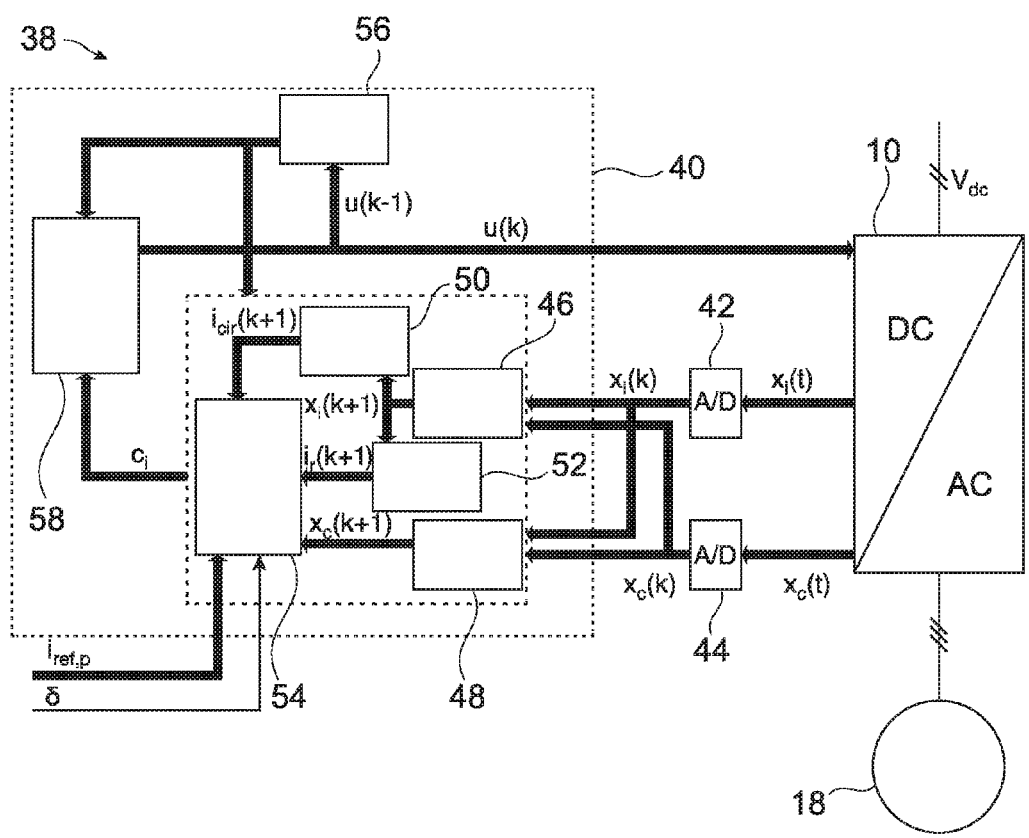
FIG. 5 schematically shows a controller according to an embodiment of the invention.

FIG. 5 shows a system 38 with a controller 40 that is adapted to execute the method of FIG. 3.

The controller 40 receives the state vector of the first model $x_i(k)$ and the state vector of the second internal model $x_c(k)$ via two A/D transformers 42, 44 that receive the corresponding measurement values $x_i(t)$ and $x_c(t)$ from the converter 10. Furthermore, the offset value $\delta$ and the reference currents $i_{ref,p}$ are external parameters for the controller 40.

From these inputs, the controller 40 generates the next switching state u(k) that is directly applied to the switches of the converter 10.

The state vectors $x_i(k)$ and $x_c(k)$ are inputs to an arm current prediction module 46 that predicts the state vector $x_i(k+1)$ (including the arm currents $i_{pP}$, $i_{pN}$) for the next time step k+1.

The state vectors $x_i(k)$ and $x_c(k)$ are inputs to a voltage prediction module 48 that predicts the state vector $x_c(k+1)$ (i.e. the capacitor voltages $V_{c,pq}$) for the next time step k+1.

From the state vectors $x_i(k+1)$, the circulating currents $i_{cir,p}(k+1)$ are predicted by a circulating current module 50 and the load current ripples $i_{r,p}(k+1)$ by a current ripple module 52.

A candidate, extrapolation and cost function evaluation module 54 receives the state vector $x_c(k+1)$, the circulating currents $i_{cir,p}(k+1)$ and the load current ripples $i_{r,p}(k+1)$ and determines a set of costs $c_j$ with the aid of the offset value $\delta$ and the reference currents $i_{ref,p}$.

The modules 46, 48, 50, 52, 54 additionally receive a set of possible future switching states u(k) that are used for determining the respective outputs of the modules.

The set of possible future switching states u(k) is determined by an enumeration module 56 from the previous switching state u(k−1), which may be stored in an intermediate storage for one time step.

A minimum cost and switch selection modules receives the set of costs $c_j$, selects the candidate sequence with the minimal cost and generates the next switching state u(k) to be applied to the converter 10.

Cost Functions

As a first example, given the last switching state u(k−1), the following cost function may be evaluated for all candidate sequences $$C_j = \lambda_1 \frac{\|u_j(k) - u(k-1)\|}{N_j} + \lambda_2 \|V_{cDiff}(k+N_j)\|_2^2 + \lambda_3 \|V_{cNom}(k+N_j)\|_2^2,$$

$$j \in J$$

where, $$V_{cDiff}(k) = \begin{bmatrix} V_{c,a1}(k) - V_{c,a2}(k) \\ V_{c,a3}(k) - V_{c,a4}(k) \\ V_{c,b1}(k) - V_{c,b2}(k) \\ V_{c,b3}(k) - V_{c,b4}(k) \\ V_{c,c1}(k) - V_{c,c2}(k) \\ V_{c,c3}(k) - V_{c,c4}(k) \end{bmatrix}$$

$$V_{cNom}(K) = \begin{bmatrix} V_{c,a1}(k) - \frac{V_{ED}}{2} \\ V_{c,a2}(k) - \frac{V_{ED}}{2} \\ V_{c,a3}(k) - \frac{V_{ED}}{2} \\ V_{c,a4}(k) - \frac{V_{ED}}{2} \\ V_{c,b1}(k) - \frac{V_{ED}}{2} \\ V_{c,b2}(k) - \frac{V_{ED}}{2} \\ V_{c,b3}(k) - \frac{V_{ED}}{2} \\ V_{c,b4}(k) - \frac{V_{ED}}{2} \\ V_{c,c1}(k) - \frac{V_{ED}}{2} \\ V_{c,c2}(k) - \frac{V_{ED}}{2} \\ V_{c,c3}(k) - \frac{V_{ED}}{2} \\ V_{c,c4}(k) - \frac{V_{ED}}{2} \end{bmatrix}$$

The first term in the cost function is based on a number of switching operations between two consecutive converter switching states. The first term penalizes the number of switch transitions discounted over the prediction horizon, allowing one to minimize the switching effort. It is evaluated by dividing the number of switch transitions by the total length of the predicted switching trajectory, including the extrapolation segment.

The second term in the cost function is based on a difference between module voltages of converter modules 12 of a converter arm 14 comprising at least two converter modules 12 connected in series. The second term is used to minimize the difference in the capacitor voltages within the upper arm 14 and the lower arm 14, respectively.

The third term in the cost function is based on a difference between module voltages and a supply voltage. The third term minimizes the difference between the terminal capacitor voltages and one half of the supply voltage, $$\frac{V_{ED}}{2}.$$

It sets a reference for the average value of the capacitor voltages and minimizes the ripple around that reference value. Here, $\lambda_1$, $\lambda_2$ and $\lambda_3$ are the weighting coefficients.

It is important to note that the cost function without the second term may lead to unsymmetrical capacitor voltage waveforms. In that case, the third term will just control the average of the capacitor voltages and the ripple of the capacitor voltages can be higher.

There are possible additions to and modifications of the cost function. The previously presented cost function may be augmented to achieve stricter control over the capacitor voltages by using the following terms:

$$C_j = \lambda_1 \frac{\|u_j(k) - u(k-1)\|}{N_j} + \lambda_2 \|V_{cDiff}(k+N_j)\|_2^2 +$$
$$\lambda_3 \|V_{cAvg}(k+N_j)\|_2^2 + \lambda_4 \|V_{cPhAvg}(k+N_j)\|_2^2,$$

$$j \in J$$

where, $$V_{cAvg}(k) = \begin{bmatrix} V_{c,a1}(k) + V_{c,a2}(k) - V_{c,a3}(k) - V_{c,a4}(k) \\ V_{c,b1}(k) + V_{c,b2}(k) - V_{c,b3}(k) - V_{c,b4}(k) \\ V_{c,c1}(k) + V_{c,c2}(k) - V_{c,c3}(k) - V_{c,c4}(k) \end{bmatrix}$$

$$V_{cPhAvg}(k) = \begin{bmatrix} V_{c,a1}(k) + V_{c,a2}(k) - V_{c,a3}(k) - V_{c,a4}(k) - \\ V_{c,b1}(k) + V_{c,b2}(k) - V_{c,b3}(k) - V_{c,b4}(k) \\ V_{c,b1}(k) + V_{c,b2}(k) - V_{c,b3}(k) - V_{c,b4}(k) - \\ V_{c,c1}(k) + V_{c,c2}(k) - V_{c,c3}(k) - V_{c,c4}(k) \\ V_{c,c1}(k) + V_{c,c2}(k) - V_{c,c3}(k) - V_{c,c4}(k) - \\ V_{c,a1}(k) + V_{c,a2}(k) - V_{c,a3}(k) - V_{c,a4}(k) \end{bmatrix}$$

The first and second term in the second cost function is the same as presented in the first cost function.

The third term of the second cost function is based on a difference between the sum of module voltages of a first converter arm for a phase and the sum of module voltages of a second converter arm for the same phase. The third term of the second cost function minimizes the difference in the terminal average value of the capacitor voltages between the top and the bottom arm.

The fourth term of the second cost function is based on a difference between the sum of module voltages of a first phase and the sum of module voltages of a second phase. The fourth term minimizes the difference in the average value of the capacitor voltages in all the three phases.

Another possible third cost function, which balances the capacitor voltages and reduces the circulating currents, is presented below:

$$C_j = \lambda_1 \frac{\|u_j(k) - u(k-1)\|}{N_j} + \lambda_2 \|V_{cDiff}(k+N_j)\|_2^2 + \lambda_3 \|i_{cir}(k+N_j)\|_2^2,$$

$$j \in J$$

$$i_{cir} = \begin{bmatrix} i_{cir,a}(k) \\ i_{cir,b}(k) \\ i_{cir,c}(k) \end{bmatrix}$$

The first and second term in the third cost function is the same as presented in the first cost function.

The third term of the third cost function is based on circulating currents in the converter. It minimizes the terminal circulating currents, i.e. the linearly extrapolated circulating currents at the end of the prediction horizon.

It has to be understood that the different terms of the different cost functions may be mixed with each other to generated further embodiments of cost function.

Generalization to Converters with N Arm Modules and M Phases

When considering M2LC topologies with an arbitrary number of arm modules N and any number of phases M, the dimension of the vectors and matrices of the models is changed, but the control method in general remains the same.

Specifically, when considering N arm modules (instead of N=2) and M=3 phases (as previously), the following changes occur:

The modified switching state vector is $u=[u_{a1} \ldots u_{a2N} u_{b1} \ldots u_{b2N} u_{c1} \ldots u_{c2N}]^T \in \{0,1\}^{4N}$ The system matrices $A_i$, $B_{i1}$, $B_{i2}$ and $C_i$ of the first system are changed accordingly.

The modified vector of the capacitor voltages is $[V_{c,a1} \ldots V_{c,a2N} V_{c,b1} \ldots V_{c,b2N} V_{c,c1} \ldots V_{c,c2N}]$ The system matrices $A_c$, $B_c$ and $C_c$ of the second system are changed accordingly.

The total number of switching sequences to be considered for the 'SE' scheme is $j_{max}$, which increases, as N is increased.

When evaluating the cost function, the dimension of the vectors in the cost function, including u, $V_{cdiff}$ and $V_{cNom}$ is modified accordingly. The same applies to the alternative cost function formulations.

When considering arbitrary M (number of phases different from three), the control algorithm remains unchanged; only the system matrices, $j_{max}$ and the dimension of the vectors in the cost function change. These changes are similar to the ones detailed above for arbitrary N (number of modules per arm).

Generalization to Other Topologies

The control method is applicable to modular converters and modular multi-level converters with an arbitrary number N of modules 12 per arm and an arbitrary number M of phases 16.

In the following different topologies for modular converters are shown, which may be controlled by embodiments of the method as described above.

Figure 10:
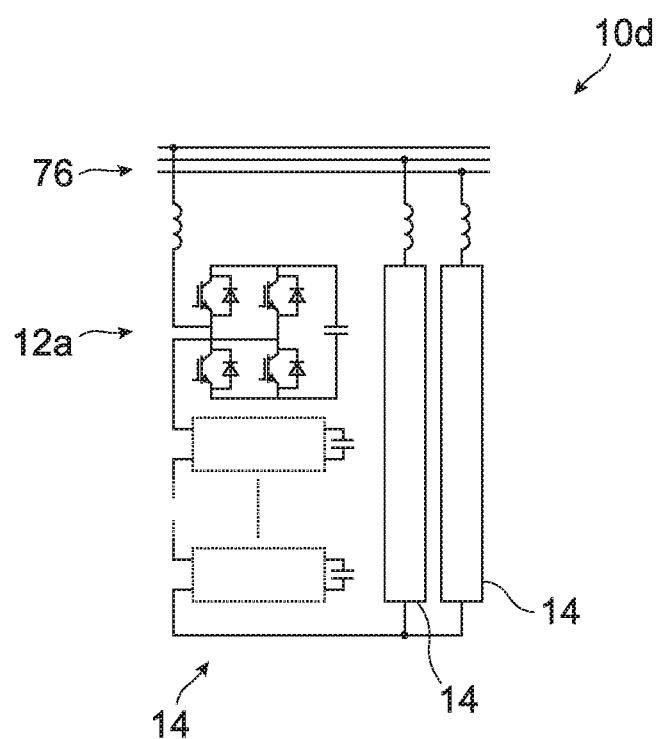
FIG. 10 schematically shows a modular converter according to a further embodiment of the invention.
Figure 11:
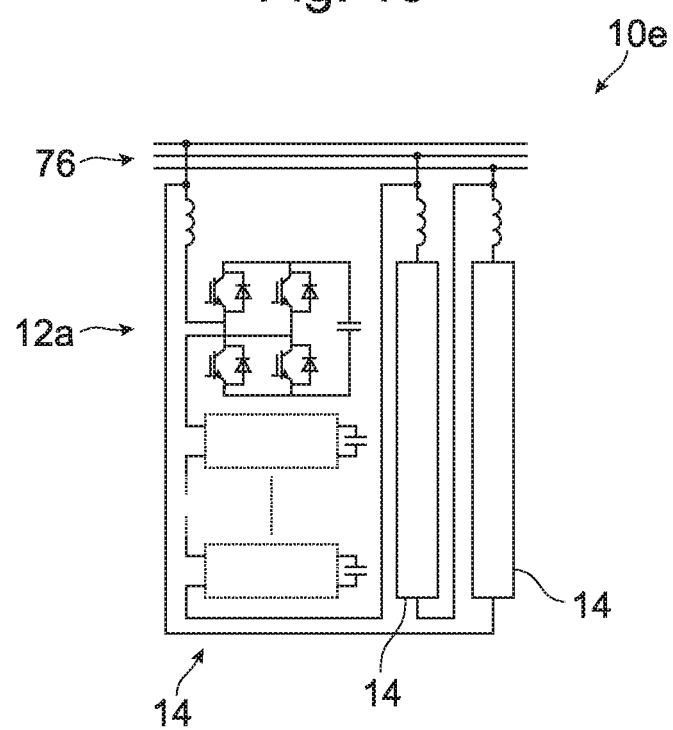
FIG. 11 schematically shows a modular converter according to a further embodiment of the invention.

These topologies may be grouped into the following groups and sub groups:
  double-star topologies:
    DC-AC. An example for N=2 arm modules and M=3 phases is shown in FIG. 1.
    AC-DC. It may have the same topology as the DC-AC converter shown in FIG. 1, but with the standard power flow being from AC to DC, i.e. an active rectifier.
  (single) star and (single) delta topologies, as shown in FIGS. 10 and 11
  AC-AC topologies:
    Three-phase AC to three-phase AC: see FIG. 6, where one module may be represented as shown in FIG. 7
    Single-phase AC to single-phase AC
    Single-phase AC to three-phase AC
    Hexverter: see FIG. 8
  DC-DC topologies: see FIGS. 9 and 12
  Dual modular multi-level converters: see FIG. 13

Embodiments of the proposed control method are applicable to all topologies. All converters shown in the following may have a controller 40, which is adapted for executing the method as described above. The control concept remains unchanged. Only the system matrices, $j_{max}$ and the dimension of the vectors in the cost function may have to be adapted to the specific topology.

Figure 6:
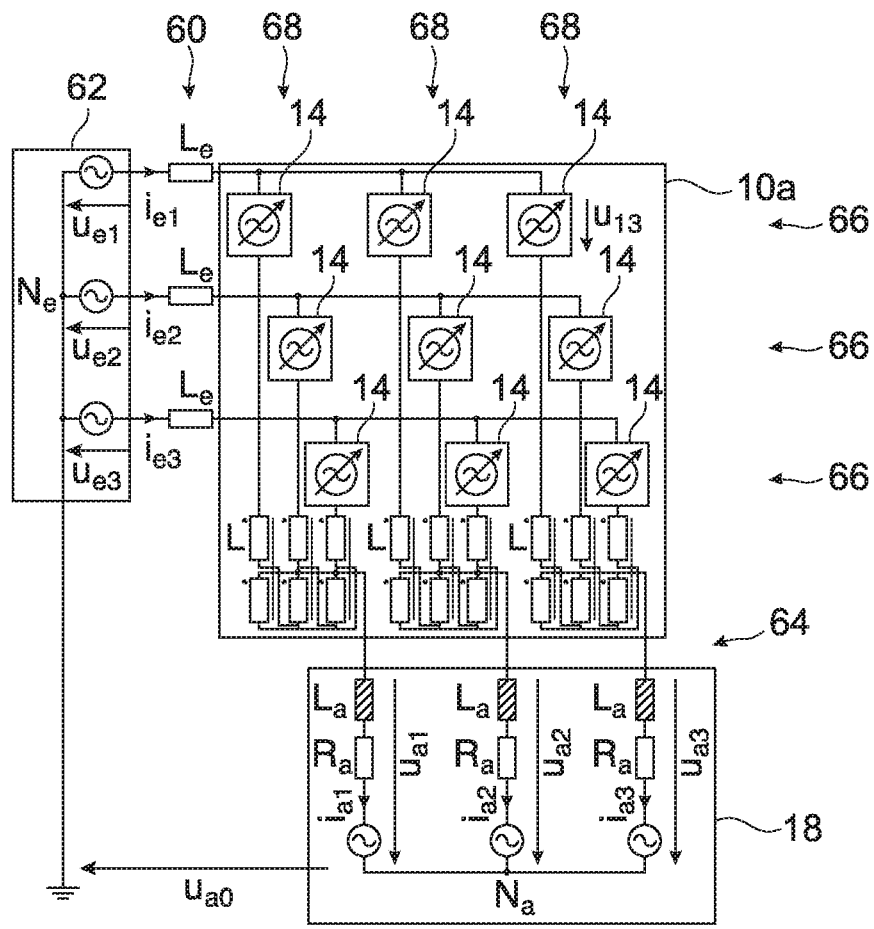
FIG. 6 schematically shows a modular converter according to a further embodiment of the invention.
Figure 7:
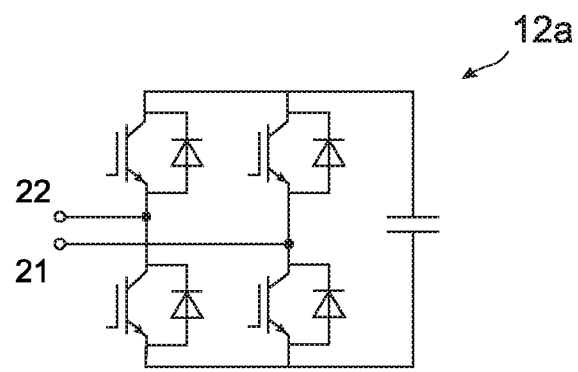
FIG. 7 schematically shows a converter module for the converter of FIG. 6.

FIG. 6 shows an AC-AC modular multi-level converter 10a with nine converter arms 14. The converter 10 has a three-phase input 60 connected to a three-phase AC system 62 and a three-phase output 64 connected to a three phase AC machine or load 18.

The arms 14 are connected in such a way that each arm 14 is connected to one input phase of the three-phase input 60 and to one output phase of the three-phase output 64. The arms 14 may be grouped into groups of three arms 14 that form subconverters 66, 68 of the converter 10.

Each of the three rows of the converter 10a forms a single-phase AC to three-phase AC subconverter 66. The three arms 14 of the subconverter 66 are star-connected with the respective input phase.

Each of the three columns of the converter 10a forms a three-phase AC to single-phase AC subconverter 68. The three arms 14 of the subconverter 68 are star-connected with the respective output phase.

The converter arms 14 of the modular converter 10 shown in FIG. 1 comprise converter modules 12 with so-called unipolar cells, which comprise two switches. The module 12 is also called a chopper module.

The arms 14 of the modular converter 10a shown in FIG. 6 comprise converter modules 12a connected in series with so-called bipolar cells. The module 12a is also called a bridge module.

Such a converter module 12a with a bipolar cell with four switches is shown in FIG. 7. The converter module 12 provides only unidirectional power flow, while the converter module 12a allows for bidirectional power flow. For the DC-AC and AC-DC topologies, both types of modules 12, 12a may be used. For all the other topologies usually the bridge converter module 12a is used.

The converter module 12a shown in FIG. 7 has compared to the converter module 12 shown in FIG. 2 an extended functionality. The converter module 12a has two power connectors 21, 22, which are acting as the input as well as the output of the converter module 12a. Beside the power connectors 21, 22 the converter module might have further connections for controlling the converter module 12a, for diagnose purposes and other control objectives. The power connectors 21, 22 can either short circuited or connected to the capacitor by the power semiconductors switches. Compared with the converter module 12 shown in FIG. 2 the converter module 12a shown in FIG. 7 allows to connect the positive pole of the capacitor to ether one of the power connectors 21, 22. The same applies to the negative pole of the capacitor.

The two power connectors 21, 22 of each converter module are referred to as the inputs. Further, the voltage of the capacitor is referred to as the module voltage or capacitor voltage.

Figure 8:
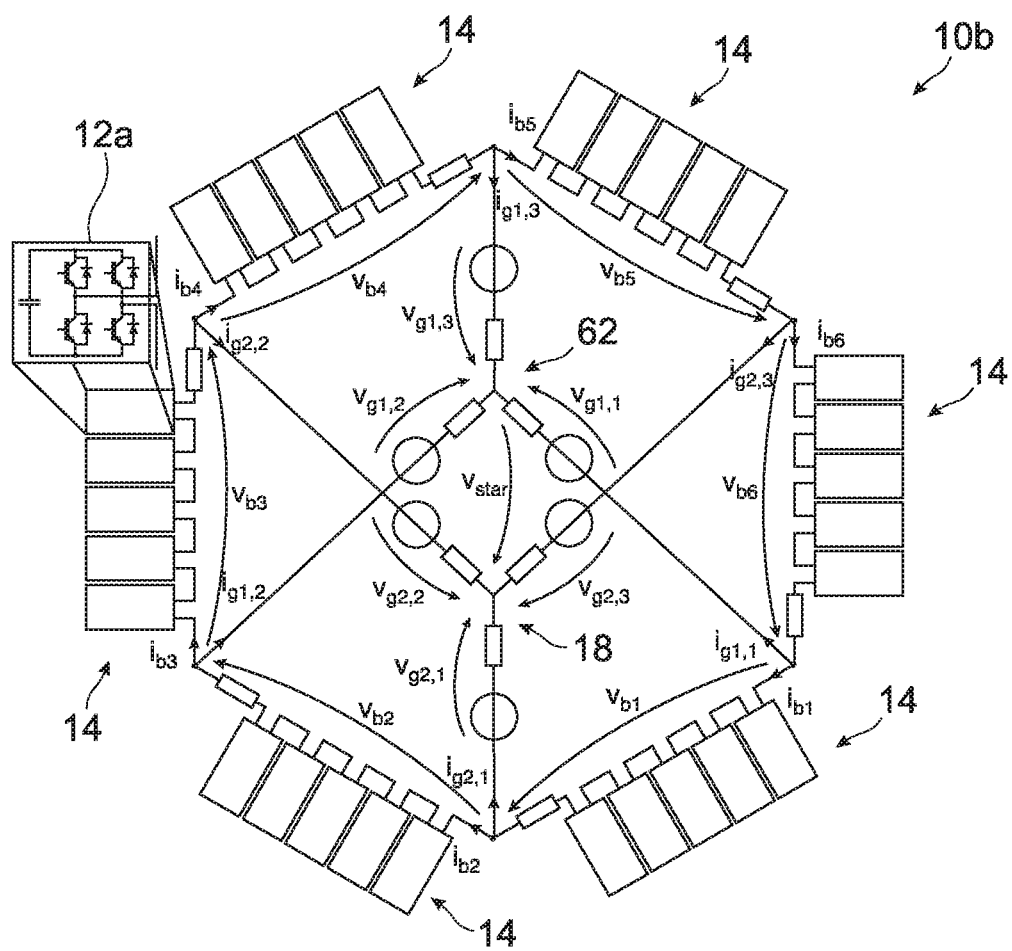
FIG. 8 schematically shows a modular converter according to a further embodiment of the invention.

FIG. 8 shows another topology for a direct AC-AC modular converter, a so-called hexverter 10b, which comprises six converter arms 14 with series connected converter modules 12. The converter modules 12 comprise bipolar cells.

The hexverter 10b interconnects a first three-phase system 62 with a second three-phase system 18. Each phase of the first system 62 and of the second system 18 is connected to a connection point between two arms 14, such that the phases of the first system 62 and of the second system 18 alternate, when going around the ring of converter arms 14.

Figure 9:
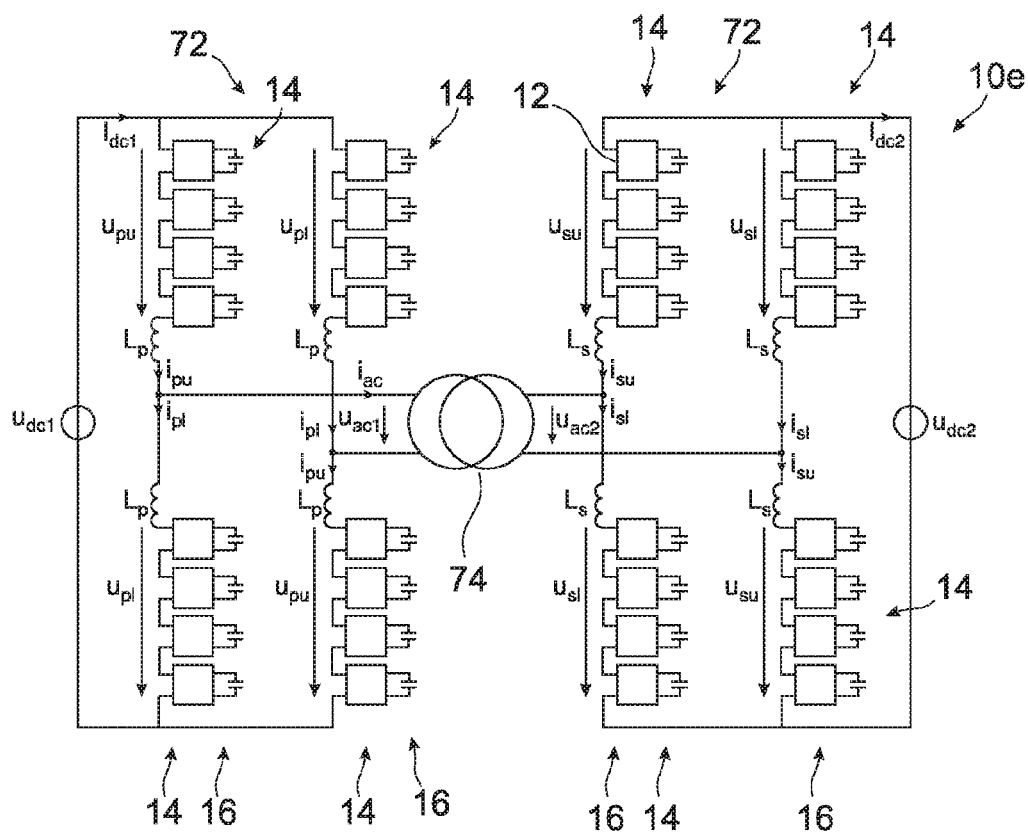
FIG. 9 schematically shows a modular converter according to a further embodiment of the invention.

FIG. 9 shows a modular DC-DC converter 10c, which comprises an active rectifier 70, which may be seen as a modular DC-AC subconverter 70, and an AC-DC subconverter 72, which are interconnected by a transformer 74. Both subconverters 70, 72 have a topology analogous to the topology of the converter 10 of FIG. 1. However, each of the subconverters 70, 72 only has two phases 16.

FIG. 10 shows a modular converter 10*d* connected to a multi-phase power line 76. The converter 10*d* has a converter arm 14 connected to each of the phases of the power line 76. At the other end, the converter arms 14 are star-connected.

FIG. 11 shows a modular converter 10*e* also connected to a multi-phase power line 76. However, the converter arms 14 are delta-connected with phases of the power line 76, i.e. each converter arm 14 is directly connected to two different phases.

The converter arms 14 of the modular converters 10*d* and 10*e* comprise series-connected converter modules 12*a* with bipolar cells.

The modular converters 10*d* and 10*e* may be used in STATCOMs.

Figure 12:
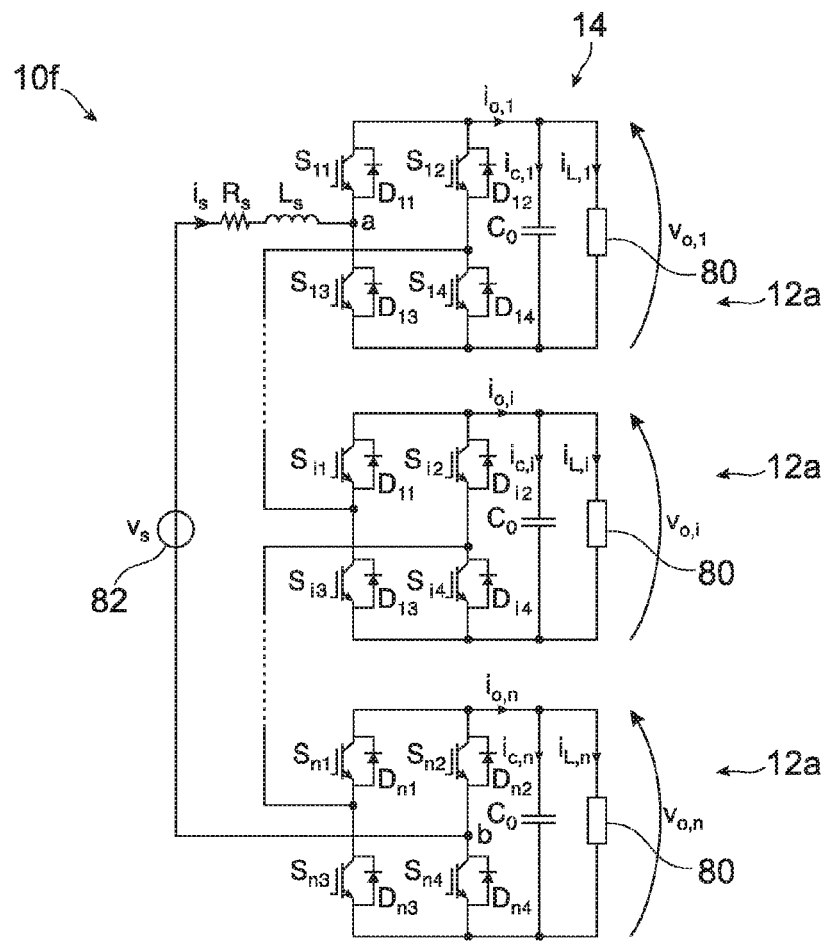
FIG. 12 schematically shows a modular converter according to a further embodiment of the invention.

FIG. 12 shows a modular converter 10*f* with a DC-DC topology. The converter 10 comprises one arm 14 with series-connected converter modules 12*a*. Multiple DC sources 80, for example batteries, are connected in parallel to each converter module 12*a*. The ends of the arm 14 are connected to a DC-source 82.

The modular converter 10*d* may be used for charging and discharging batteries in a battery storage unit.

Figure 13:
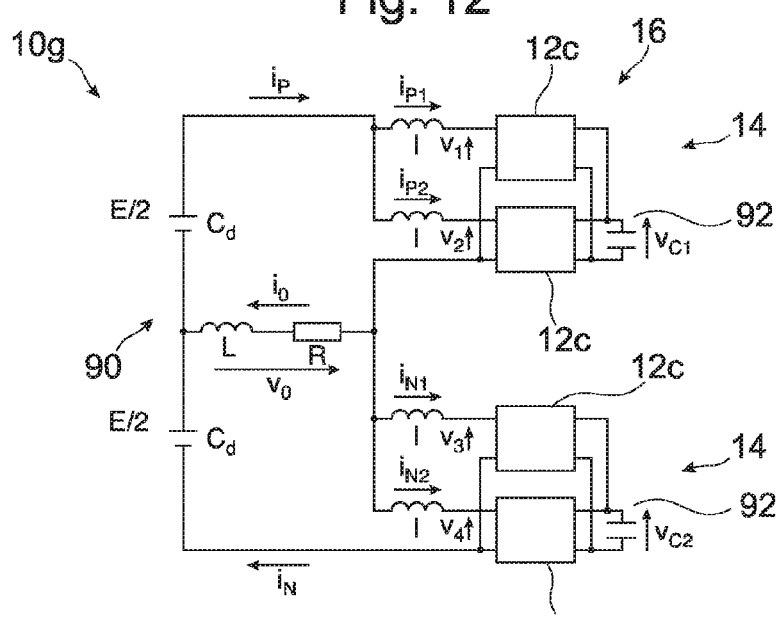
FIG. 13 schematically shows a modular converter according to a further embodiment of the invention.

FIG. 13 shows a modular converter 10*g* with a DC-AC dual topology. A DC source 90 is connected to one phase 16 comprising two converter arms 14. Each of the converter arms has two converter modules 12*c* connected in parallel. The converter modules 12*c* of one arm 14 share a common capacitor 92.

In the converters 10, 10*a* to 10*f*, the converter modules are connected in series so as to increase the voltage. In the modular converter 10*g*, the modules are connected in parallel to achieve higher current ratings.

In the above examples and embodiments, the converter modules were described having the capacitor. Instead of the capacitor also a different energy storage or energy source could be used such as a battery, an fuel cell or photovoltaic cell. Such energy sources or energy storages could also be installed in addition to the described capacitor. For such cases also the capacitor voltage $V_{c,pq}$ must be generalized to a module voltage $V_{c,pq}$.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method for controlling a modular converter with a plurality of converter modules, each converter module having two power connectors, power semiconductors and an energy storage and/or an energy source, wherein the power connectors are short-circuited in a first switching state of the power semiconductors and are connected to the energy storage and/or energy source in a second switching state of the power semiconductors, the method comprising:

selecting possible future switching sequences of the modular converter based on an actual converter switching state, wherein a switching sequence is a series of converter switching states with at least one converter switching state, and the converter switching state includes switching states of the plurality of converter modules;

predicting a future current trajectory for each switching sequence based on actual internal currents and on actual internal voltages;

determining candidate sequences from the switching sequences, wherein a candidate sequence is a switching sequence with a current trajectory within predefined bounds with respect to a reference current or, when the current trajectory is outside the predefined bounds, moves the current trajectory closer to the predefined bound;

predicting future module voltages for each candidate sequence based on actual module voltages and the current trajectory of a respective candidate sequence;

evaluating a cost function for each candidate sequence, wherein the cost function is based on converter switching states of at least one of the switching sequence, the future module voltages and future currents; and selecting a next converter switching state as a first converter switching state of a candidate sequence with a minimal cost among evaluated cost functions.

2. The method of claim 1, wherein the cost function is based on a number of switching operations between two consecutive converter switching states.

3. The method of claim 1, wherein the cost function is based on a difference between module voltages of converter modules of a converter arm, the converter arm comprising:
at least two converter modules connected in series.

4. The method of claim 1, wherein the cost function is based on a difference between a module voltage and a supply voltage at an input of the converter.

5. The method of claim 1, wherein the cost function is based on a difference between a sum of module voltages of a first converter arm for a phase and a sum of module voltages of a second converter arm for a same phase or a different phase.

6. The method of claim 1, wherein the cost function is based on a difference between a sum of module voltages of a first phase, and a sum of module voltages of a second phase.

7. The method of claim 1, comprising:
deselecting candidate sequences for which the future module voltages do not stay within predefined bounds.

8. The method of claim 1, wherein each converter module comprises:
at least one module capacitor; and/or
wherein the module voltages are capacitor voltages over the at least one module capacitor.

9. The method of claim 1, wherein a switching sequence comprises:
a switching step associated with a converter switching state, in which switching step a future current of the modular converter is predicted for switching the modular converter into an associated converter switching state; and/or
wherein a switching sequence comprises:
an extrapolation step, in which current is extrapolated over at least one time step until the current is outside the predefined bounds.

10. The method of claim 1, wherein the future current trajectory is predicted based on a first internal model of the modular converter; and/or
wherein future module voltages are predicted based on a second internal model of the modular converter, which is dependent on the first internal model.

11. The method of claim 1, comprising:
changing converter topology by bypassing a converter module; and
adapting a first and/or second model of the modular converter to the changed converter topology.

12. A computer program stored in a non-transitory medium which, when on a processor, will cause the processor to function as a specially configured processor for performing the method of claim 1.

13. A controller for controlling a modular converter, wherein the controller is configured with a computer program stored in non-transitory form for executing the method of claim 1.

14. A non-transitory computer-readable medium in which a computer program according to claim 12 is stored.

15. A modular converter, comprising:
a plurality of converter modules each having a capacitor; and
a controller according to claim 13.

16. The method of claim 2, comprising:
deselecting candidate sequences for which future module voltages do not stay within predefined bounds.

17. The method of claim 16, wherein each converter module comprises:
a module capacitor; and/or
wherein the module voltages are capacitor voltages over module capacitors.

18. The method of claim 17, wherein a switching sequence comprises:
a switching step associated with a converter switching state, in which switching step a future current of the modular converter is predicted for switching the modular converter into an associated converter switching state; and/or
wherein a switching sequence comprises:
an extrapolation step, in which current is extrapolated over at least one time step until the current is outside the predefined bounds.

19. The method of claim 18, wherein the future current trajectory is predicted based on a first internal model of the modular converter; and/or
wherein the future module voltages are predicted based on a second internal model of the modular converter, which is dependent on the first internal model.

20. The method of claim 19, comprising:
changing the converter topology by bypassing a converter module; and
adapting at least one of the first and second model of the modular converter to the changed converter topology.

* * * * *